US008006594B2

(12) United States Patent
Hayner et al.

(10) Patent No.: US 8,006,594 B2
(45) Date of Patent: Aug. 30, 2011

(54) CATHETER CUTTING TOOL

(75) Inventors: Louis R. Hayner, Bothell, WA (US); Evan M. Keech, Shoreline, WA (US); Lucas S. Gordon, Vashon, WA (US)

(73) Assignee: Cardiac Dimensions, Inc., Kirkland, WA (US)

( * ) Notice: Subject to any disclaimer, the term of this patent is extended or adjusted under 35 U.S.C. 154(b) by 507 days.

(21) Appl. No.: 12/189,527

(22) Filed: Aug. 11, 2008

(65) Prior Publication Data

US 2010/0031793 A1 Feb. 11, 2010

(51) Int. Cl.
*B26D 1/00* (2006.01)
*B23D 21/06* (2006.01)

(52) U.S. Cl. ..................................... 83/54; 83/17; 30/94

(58) Field of Classification Search ................ 83/13, 17, 83/18, 54, 591, 451–455, 544; 30/92, 93–96, 30/91.2, 90.1, 90.2; D24/112; 604/95.05, 604/523–532

See application file for complete search history.

(56) References Cited

U.S. PATENT DOCUMENTS 2,683,930 A * 7/1954 Walters .......................... 30/90.3
3,305,925 A * 2/1967 Middleton, Jr. ................. 30/289
3,620,212 A 11/1971 Fannon, Jr. et al.
3,786,806 A 1/1974 Johnson et al.
3,803,895 A * 4/1974 King, Jr. ......................... 72/324
3,834,019 A * 9/1974 Smeltzer et al. .................. 30/92
3,890,977 A 6/1975 Wilson
3,974,526 A 8/1976 Dardik et al.
3,995,623 A 12/1976 Black et al.
4,055,861 A 11/1977 Carpentier et al.
4,164,046 A 8/1979 Cooley
4,485,816 A 12/1984 Krumme
4,550,870 A 11/1985 Krumme et al.
4,588,395 A 5/1986 Lemelson
4,594,029 A * 6/1986 Michael, III .................. 408/1 R
4,628,783 A * 12/1986 Brownell et al. ............... 83/862
4,827,816 A * 5/1989 Takaniemi ..................... 82/70.1
4,830,023 A 5/1989 de Toledo et al.
4,958,434 A * 9/1990 Marschner ...................... 30/101
4,969,703 A * 11/1990 Fyfe et al. ...................... 385/123
4,970,926 A * 11/1990 Ghajar et al. .............. 83/468.94
4,979,299 A * 12/1990 Bieganski ...................... 30/90.1
5,061,277 A 10/1991 Carpentier et al.
5,074,043 A * 12/1991 Mills .............................. 30/91.2
5,099,838 A 3/1992 Bardy (Continued)

FOREIGN PATENT DOCUMENTS

EP 0893133 1/1999

(Continued)

OTHER PUBLICATIONS

Nieminen et al.; U.S. Appl. No. 12/907,907 entitled "Tissue Shaping Device," filed Oct. 19, 2010.

(Continued)

*Primary Examiner* — Sean Michalski
(74) *Attorney, Agent, or Firm* — Shay Glenn LLP

(57) ABSTRACT

Systems and methods for cutting, or trimming, a catheter at a specified location along the length of the catheter. The catheter preferably includes a stop feature comprising a difference in a physical characteristic between a first portion of the catheter and a second portion of the catheter which interacts with an elongate member of the cutting system to determine the catheter is in a proper position to be cut.

6 Claims, 11 Drawing Sheets

U.S. PATENT DOCUMENTS

| | | | | |
|---|---|---|---|---|
| 5,104,404 | A | 4/1992 | Wolff | |
| 5,250,071 | A | 10/1993 | Palermo | |
| 5,253,558 | A * | 10/1993 | Guddal, Jr. | 83/18 |
| 5,261,916 | A | 11/1993 | Engelson | |
| 5,265,601 | A | 11/1993 | Mehra | |
| 5,301,427 | A * | 4/1994 | Swatek | 30/101 |
| 5,311,663 | A * | 5/1994 | Garze et al. | 30/90.6 |
| 5,350,420 | A | 9/1994 | Cosgrove et al. | |
| 5,433,727 | A | 7/1995 | Sideris | |
| 5,441,515 | A | 8/1995 | Khosravi et al. | |
| 5,449,373 | A | 9/1995 | Pinchasik et al. | |
| 5,454,365 | A | 10/1995 | Bonutti | |
| 5,458,615 | A | 10/1995 | Klemm et al. | |
| 5,474,557 | A | 12/1995 | Mai | |
| 5,507,295 | A | 4/1996 | Skidmore | |
| 5,507,802 | A | 4/1996 | Imran | |
| 5,514,161 | A | 5/1996 | Limousin | |
| 5,554,177 | A | 9/1996 | Kieval et al. | |
| 5,562,698 | A | 10/1996 | Parker | |
| 5,575,818 | A | 11/1996 | Pinchuk | |
| 5,584,867 | A | 12/1996 | Limousin et al. | |
| 5,601,600 | A | 2/1997 | Ton | |
| 5,662,703 | A | 9/1997 | Yurek et al. | |
| 5,676,671 | A | 10/1997 | Inoue | |
| 5,733,325 | A | 3/1998 | Robinson et al. | |
| 5,741,297 | A | 4/1998 | Simon | |
| 5,752,969 | A | 5/1998 | Cunci et al. | |
| 5,800,519 | A | 9/1998 | Sandock | |
| 5,824,071 | A | 10/1998 | Nelson et al. | |
| 5,836,882 | A | 11/1998 | Frazin | |
| 5,871,501 | A | 2/1999 | Leschinsky et al. | |
| 5,891,193 | A | 4/1999 | Robinson et al. | |
| 5,895,391 | A | 4/1999 | Farnholtz | |
| 5,899,882 | A | 5/1999 | Waksman et al. | |
| 5,908,404 | A | 6/1999 | Elliot | |
| 5,928,258 | A | 7/1999 | Khan et al. | |
| 5,935,161 | A | 8/1999 | Robinson et al. | |
| 5,954,761 | A | 9/1999 | Machek et al. | |
| 5,961,545 | A | 10/1999 | Lentz et al. | |
| 5,978,705 | A | 11/1999 | KenKnight et al. | |
| 5,984,944 | A | 11/1999 | Forber | |
| 6,007,519 | A | 12/1999 | Rosselli | |
| 6,015,402 | A | 1/2000 | Sahota | |
| 6,022,371 | A | 2/2000 | Killion | |
| 6,027,517 | A | 2/2000 | Crocker et al. | |
| 6,053,900 | A | 4/2000 | Brown et al. | |
| 6,056,775 | A | 5/2000 | Borghi et al. | |
| 6,073,526 | A * | 6/2000 | Pettersson | 83/54 |
| 6,077,295 | A | 6/2000 | Limon et al. | |
| 6,077,297 | A | 6/2000 | Robinson et al. | |
| 6,080,182 | A | 6/2000 | Shaw et al. | |
| 6,086,611 | A | 7/2000 | Duffy et al. | |
| 6,096,064 | A | 8/2000 | Routh | |
| 6,099,549 | A | 8/2000 | Bosma et al. | |
| 6,099,552 | A | 8/2000 | Adams | |
| 6,129,755 | A | 10/2000 | Mathis et al. | |
| 6,149,996 | A * | 11/2000 | Helgerson et al. | 428/36.9 |
| 6,171,320 | B1 | 1/2001 | Monassevitch | |
| 6,183,512 | B1 * | 2/2001 | Howanec et al. | |
| 6,190,406 | B1 * | 2/2001 | Duerig et al. | |
| 6,200,336 | B1 | 3/2001 | Pavcnik et al. | |
| 6,205,897 | B1 * | 3/2001 | Carter | 83/54 |
| 6,210,432 | B1 * | 4/2001 | Solem et al. | |
| 6,217,565 | B1 * | 4/2001 | Cohen | 604/525 |
| 6,228,098 | B1 * | 5/2001 | Kayan et al. | |
| 6,241,757 | B1 * | 6/2001 | An et al. | |
| 6,254,628 | B1 * | 7/2001 | Wallace et al. | |
| 6,267,783 | B1 * | 7/2001 | Letendre et al. | |
| 6,275,730 | B1 * | 8/2001 | KenKnight et al. | |
| 6,306,141 | B1 | 10/2001 | Jervis | |
| 6,312,446 | B1 * | 11/2001 | Huebsch et al. | |
| 6,334,864 | B1 * | 1/2002 | Amplatz et al. | |
| 6,342,067 | B1 * | 1/2002 | Mathis et al. | |
| 6,345,198 | B1 * | 2/2002 | Mouchawar et al. | |
| 6,352,553 | B1 * | 3/2002 | van der Burg et al. | |
| 6,352,561 | B1 * | 3/2002 | Leopold et al. | |
| 6,358,195 | B1 * | 3/2002 | Green et al. | |
| 6,368,316 | B1 * | 4/2002 | Jansen et al. | 604/526 |
| 6,374,476 | B1 * | 4/2002 | Ponzi et al. | 29/527.1 |
| 6,378,218 | B2 * | 4/2002 | Sigwart et al. | 30/363 |
| 6,395,017 | B1 * | 5/2002 | Dwyer et al. | |
| 6,402,781 | B1 * | 6/2002 | Langberg et al. | |
| 6,419,696 | B1 * | 7/2002 | Ortiz et al. | |
| 6,442,427 | B1 * | 8/2002 | Boute et al. | |
| 6,464,684 | B1 * | 10/2002 | Galdonik | 604/527 |
| 6,464,720 | B2 | 10/2002 | Boatman et al. | |
| 6,503,271 | B2 | 1/2003 | Duerig et al. | |
| 6,503,353 | B1 * | 1/2003 | Peterson et al. | 156/86 |
| 6,537,314 | B2 | 3/2003 | Langberg et al. | |
| 6,562,067 | B2 | 5/2003 | Mathis | |
| 6,569,198 | B1 | 5/2003 | Wilson et al. | |
| 6,589,208 | B2 | 7/2003 | Ewers et al. | |
| 6,599,314 | B2 | 7/2003 | Mathis et al. | |
| 6,602,288 | B1 | 8/2003 | Cosgrove et al. | |
| 6,602,289 | B1 | 8/2003 | Colvin et al. | |
| 6,616,651 | B1 * | 9/2003 | Stevens | 604/524 |
| 6,623,521 | B2 | 9/2003 | Steinke et al. | |
| 6,626,899 | B2 | 9/2003 | Houser et al. | |
| 6,629,534 | B1 | 10/2003 | St. Goar et al. | |
| 6,629,994 | B2 | 10/2003 | Gomez et al. | |
| 6,643,546 | B2 | 11/2003 | Mathis et al. | |
| 6,648,881 | B2 | 11/2003 | KenKnight et al. | |
| 6,652,538 | B2 | 11/2003 | Kayan et al. | |
| 6,656,221 | B2 | 12/2003 | Taylor et al. | |
| 6,676,702 | B2 | 1/2004 | Mathis | |
| 6,689,164 | B1 | 2/2004 | Seguin | |
| 6,709,425 | B2 | 3/2004 | Gambale et al. | |
| 6,716,158 | B2 | 4/2004 | Raman et al. | |
| 6,718,985 | B2 | 4/2004 | Hlavka et al. | |
| 6,721,598 | B1 | 4/2004 | Helland et al. | |
| 6,723,038 | B1 | 4/2004 | Schroeder et al. | |
| 6,733,521 | B2 | 5/2004 | Chobotov et al. | |
| 6,743,219 | B1 | 6/2004 | Dwyer et al. | |
| 6,745,841 | B2 * | 6/2004 | Simpson | 166/380 |
| 6,764,510 | B2 | 7/2004 | Vidlund et al. | |
| 6,773,446 | B1 | 8/2004 | Dwyer et al. | |
| 6,776,784 | B2 | 8/2004 | Ginn | |
| 6,790,231 | B2 | 9/2004 | Liddicoat et al. | |
| 6,793,673 | B2 | 9/2004 | Kowalsky et al. | |
| 6,797,001 | B2 | 9/2004 | Mathis et al. | |
| 6,800,090 | B2 | 10/2004 | Alferness et al. | |
| 6,805,128 | B1 | 10/2004 | Pless et al. | |
| 6,810,882 | B2 | 11/2004 | Langberg et al. | |
| 6,821,297 | B2 | 11/2004 | Snyders | |
| 6,824,562 | B2 | 11/2004 | Mathis et al. | |
| 6,827,690 | B2 | 12/2004 | Bardy | |
| 6,881,220 | B2 | 4/2005 | Edwin et al. | |
| 6,899,734 | B2 | 5/2005 | Castro et al. | |
| 6,908,478 | B2 | 6/2005 | Alferness et al. | |
| 6,908,482 | B2 | 6/2005 | McCarthy et al. | |
| 6,935,404 | B2 | 8/2005 | Duerig et al. | |
| 6,949,122 | B2 | 9/2005 | Adams et al. | |
| 6,955,689 | B2 | 10/2005 | Ryan et al. | |
| 6,960,229 | B2 | 11/2005 | Mathis et al. | |
| 6,964,683 | B2 | 11/2005 | Kowalsky et al. | |
| 6,966,926 | B2 | 11/2005 | Mathis | |
| 6,976,995 | B2 | 12/2005 | Mathis et al. | |
| 7,004,958 | B2 | 2/2006 | Adams et al. | |
| 7,152,605 | B2 | 12/2006 | Khairkhahan et al. | |
| 7,171,753 | B2 * | 2/2007 | Korczak et al. | 30/90.1 |
| 7,175,653 | B2 | 2/2007 | Gaber | |
| 7,316,069 | B2 * | 1/2008 | Graybeal | 30/92 |
| 7,556,710 | B2 * | 7/2009 | Leeflang et al. | 156/278 |
| 7,637,946 | B2 | 12/2009 | Solem et al. | |
| 7,638,087 | B2 * | 12/2009 | Van Landuyt | 264/655 |
| 2001/0002563 | A1 * | 6/2001 | Sigwart et al. | 83/30 |
| 2001/0018611 | A1 | 8/2001 | Solem et al. | |
| 2001/0041899 | A1 | 11/2001 | Foster | |
| 2001/0044568 | A1 | 11/2001 | Langberg et al. | |
| 2001/0049558 | A1 | 12/2001 | Liddicoat et al. | |
| 2002/0016628 | A1 | 2/2002 | Langberg et al. | |
| 2002/0042621 | A1 | 4/2002 | Liddicoat et al. | |
| 2002/0042651 | A1 | 4/2002 | Liddicoat et al. | |
| 2002/0049468 | A1 | 4/2002 | Streeter et al. | |
| 2002/0055774 | A1 | 5/2002 | Liddicoat | |
| 2002/0065554 | A1 | 5/2002 | Streeter | |
| 2002/0087173 | A1 | 7/2002 | Alferness et al. | |

| | | | | |
|---|---|---|---|---|
| 2002/0095167 | A1 | 7/2002 | Liddicoat et al. | |
| 2002/0138044 | A1 | 9/2002 | Streeter et al. | |
| 2002/0151961 | A1 | 10/2002 | Lashinski et al. | |
| 2002/0156526 | A1 | 10/2002 | Hlavka et al. | |
| 2002/0161377 | A1 | 10/2002 | Rabkin et al. | |
| 2002/0183837 | A1 | 12/2002 | Streeter et al. | |
| 2002/0183838 | A1 | 12/2002 | Liddicoat et al. | |
| 2002/0183841 | A1 | 12/2002 | Cohn et al. | |
| 2002/0188170 | A1 | 12/2002 | Santamore et al. | |
| 2003/0018358 | A1 | 1/2003 | Saadat | |
| 2003/0040771 | A1 | 2/2003 | Hyodoh et al. | |
| 2003/0069636 | A1 | 4/2003 | Solem et al. | |
| 2003/0078465 | A1 | 4/2003 | Pai et al. | |
| 2003/0078654 | A1 | 4/2003 | Taylor et al. | |
| 2003/0083613 | A1 | 5/2003 | Schaer | |
| 2003/0088305 | A1 | 5/2003 | Van Schie et al. | |
| 2003/0130730 | A1 | 7/2003 | Cohn et al. | |
| 2003/0135267 | A1 | 7/2003 | Solem et al. | |
| 2003/0171776 | A1* | 9/2003 | Adams et al. | |
| 2003/0236569 | A1* | 12/2003 | Mathis et al. | |
| 2004/0010305 | A1* | 1/2004 | Alferness et al. | |
| 2004/0019377 | A1* | 1/2004 | Taylor et al. | |
| 2004/0039443 | A1* | 2/2004 | Solem et al. | |
| 2004/0073302 | A1* | 4/2004 | Rourke et al. | |
| 2004/0098116 | A1* | 5/2004 | Callas et al. | |
| 2004/0102839 | A1* | 5/2004 | Cohn et al. | |
| 2004/0102840 | A1* | 5/2004 | Solem et al. | |
| 2004/0111095 | A1* | 6/2004 | Gordon et al. | |
| 2004/0127982 | A1* | 7/2004 | Machold et al. | |
| 2004/0133220 | A1* | 7/2004 | Lashinski et al. | |
| 2004/0133240 | A1* | 7/2004 | Adams et al. | |
| 2004/0133273 | A1* | 7/2004 | Cox | |
| 2004/0138744 | A1* | 7/2004 | Lashinski et al. | |
| 2004/0148019 | A1* | 7/2004 | Vidlund et al. | |
| 2004/0148020 | A1* | 7/2004 | Vidlund et al. | |
| 2004/0148021 | A1* | 7/2004 | Cartledge et al. | |
| 2004/0153147 | A1* | 8/2004 | Mathis | |
| 2004/0158321 | A1 | 8/2004 | Reuter et al. | |
| 2004/0176840 | A1 | 9/2004 | Langberg | |
| 2004/0193191 | A1 | 9/2004 | Starksen et al. | |
| 2004/0193260 | A1 | 9/2004 | Alferness et al. | |
| 2004/0220654 | A1 | 11/2004 | Mathis et al. | |
| 2004/0220657 | A1 | 11/2004 | Nieminen et al. | |
| 2004/0243227 | A1 | 12/2004 | Starksen et al. | |
| 2004/0249452 | A1 | 12/2004 | Adams et al. | |
| 2004/0260342 | A1 | 12/2004 | Vargas et al. | |
| 2004/0260384 | A1 | 12/2004 | Allen | |
| 2005/0004667 | A1 | 1/2005 | Swinford et al. | |
| 2005/0010240 | A1 | 1/2005 | Mathis et al. | |
| 2005/0021121 | A1 | 1/2005 | Reuter et al. | |
| 2005/0027351 | A1 | 2/2005 | Reuter et al. | |
| 2005/0027353 | A1 | 2/2005 | Alferness et al. | |
| 2005/0033419 | A1 | 2/2005 | Alferness et al. | |
| 2005/0038507 | A1 | 2/2005 | Alferness et al. | |
| 2005/0060030 | A1 | 3/2005 | Lashinski et al. | |
| 2005/0065598 | A1 | 3/2005 | Mathis et al. | |
| 2005/0096666 | A1 | 5/2005 | Gordon et al. | |
| 2005/0096740 | A1 | 5/2005 | Langberg et al. | |
| 2005/0107810 | A1 | 5/2005 | Morales et al. | |
| 2005/0119673 | A1 | 6/2005 | Gordon et al. | |
| 2005/0137449 | A1 | 6/2005 | Nieminen et al. | |
| 2005/0137450 | A1 | 6/2005 | Aronson et al. | |
| 2005/0137451 | A1 | 6/2005 | Gordon et al. | |
| 2005/0137685 | A1 | 6/2005 | Nieminen et al. | |
| 2005/0149179 | A1 | 7/2005 | Mathis et al. | |
| 2005/0149180 | A1 | 7/2005 | Mathis et al. | |
| 2005/0149182 | A1 | 7/2005 | Alferness et al. | |
| 2005/0177228 | A1 | 8/2005 | Solem et al. | |
| 2005/0187619 | A1 | 8/2005 | Mathis et al. | |
| 2005/0197692 | A1 | 9/2005 | Pai et al. | |
| 2005/0197693 | A1 | 9/2005 | Pai et al. | |
| 2005/0197694 | A1 | 9/2005 | Pai et al. | |
| 2005/0209690 | A1 | 9/2005 | Mathis et al. | |
| 2005/0216077 | A1 | 9/2005 | Mathis et al. | |
| 2005/0222678 | A1 | 10/2005 | Lashinski et al. | |
| 2005/0261704 | A1 | 11/2005 | Mathis | |
| 2005/0272969 | A1 | 12/2005 | Alferness et al. | |
| 2006/0020335 | A1 | 1/2006 | Kowalsky et al. | |
| 2006/0027063 | A1* | 2/2006 | Currier et al. | 83/13 |
| 2006/0030882 | A1 | 2/2006 | Adams et al. | |
| 2006/0041305 | A1 | 2/2006 | Lauterjung | |
| 2006/0116758 | A1 | 6/2006 | Swinford et al. | |
| 2006/0142854 | A1 | 6/2006 | Alferness et al. | |
| 2006/0161169 | A1 | 7/2006 | Nieminen et al. | |
| 2006/0167544 | A1 | 7/2006 | Nieminen et al. | |
| 2006/0173536 | A1 | 8/2006 | Mathis et al. | |
| 2006/0191121 | A1 | 8/2006 | Gordon | |
| 2006/0271174 | A1 | 11/2006 | Nieminen et al. | |
| 2006/0276891 | A1 | 12/2006 | Nieminen et al. | |
| 2007/0027533 | A1 | 2/2007 | Douk | |
| 2007/0055293 | A1 | 3/2007 | Alferness et al. | |
| 2007/0066879 | A1 | 3/2007 | Mathis et al. | |
| 2007/0073391 | A1 | 3/2007 | Bourang et al. | |
| 2007/0135912 | A1 | 6/2007 | Mathis | |
| 2007/0144012 | A1* | 6/2007 | Graybeal | 30/92 |
| 2007/0173926 | A1 | 7/2007 | Bobo, Jr. et al. | |
| 2007/0175048 | A1* | 8/2007 | Holley et al. | 30/278 |
| 2007/0175049 | A1* | 8/2007 | Goode et al. | 30/280 |
| 2007/0239270 | A1 | 10/2007 | Mathis et al. | |
| 2008/0097594 | A1 | 4/2008 | Mathis et al. | |
| 2008/0140191 | A1 | 6/2008 | Mathis et al. | |
| 2008/0221673 | A1 | 9/2008 | Bobo et al. | |
| 2008/0236358 | A1* | 10/2008 | Vitullo et al. | 83/663 |
| 2009/0019704 | A1* | 1/2009 | Ehret et al. | 30/90.1 |
| 2009/0038158 | A1* | 2/2009 | Graybeal | 30/92 |
| 2010/0030330 | A1 | 2/2010 | Bobo et al. | |
| 2010/0064522 | A1* | 3/2010 | Vaccaro | 30/90.1 |
| 2010/0139465 | A1* | 6/2010 | Christian et al. | 83/23 |
| 2011/0056350 | A1* | 3/2011 | Gale et al. | 83/54 |

FOREIGN PATENT DOCUMENTS

| | | | |
|---|---|---|---|
| EP | 0903110 | A1 | 3/1999 |
| EP | 0968688 | A1 | 1/2000 |
| EP | 1050274 | A1 | 11/2000 |
| EP | 1095634 | A2 | 5/2001 |
| EP | 1177779 | A2 | 2/2002 |
| EP | 2181670 | A2 | 5/2010 |
| GB | 0741604 | | 12/1955 |
| JP | 2754067 | | 3/1998 |
| JP | 2000-308652 | | 11/2000 |
| JP | 2001-503291 | | 3/2001 |
| JP | 2003-503101 | | 1/2003 |
| JP | 2003-521310 | | 7/2003 |
| SE | 9902455 | | 12/2000 |
| WO | WO 98/56435 | A1 | 12/1998 |
| WO | WO 00/44313 | A1 | 8/2000 |
| WO | WO 00/60995 | A2 | 10/2000 |
| WO | WO 00/74603 | A1 | 12/2000 |
| WO | WO 01/00111 | A1 | 1/2001 |
| WO | WO 01/19292 | A1 | 3/2001 |
| WO | WO 01/50985 | A1 | 7/2001 |
| WO | WO 01/54618 | A1 * | 8/2001 |
| WO | WO 01/87180 | A2 * | 11/2001 |
| WO | WO 02/00099 | A2 * | 1/2002 |
| WO | WO 02/01999 | A2 * | 1/2002 |
| WO | WO 02/05888 | A1 * | 1/2002 |
| WO | WO 02/19951 | A1 * | 3/2002 |
| WO | WO 02/034118 | A2 | 5/2002 |
| WO | WO 02/047539 | A2 | 6/2002 |
| WO | WO 02/053206 | A2 | 7/2002 |
| WO | WO 02/060352 | A1 | 8/2002 |
| WO | WO 02/062263 | A2 | 8/2002 |
| WO | WO 02/062270 | A1 | 8/2002 |
| WO | WO 02/062408 | A2 | 8/2002 |
| WO | WO 02/076284 | A2 | 10/2002 |
| WO | WO 02/078576 | A2 | 10/2002 |
| WO | WO 02/096275 | A2 | 12/2002 |
| WO | WO 03/015611 | A2 | 2/2003 |
| WO | WO 03/037171 | A2 | 5/2003 |
| WO | WO 03/049647 | A1 | 6/2003 |
| WO | WO 03/049648 | A2 | 6/2003 |
| WO | WO 03/055417 | A1 | 7/2003 |
| WO | WO 03/059198 | A2 | 7/2003 |
| WO | WO 03/063735 | A2 | 8/2003 |
| WO | WO 2004/045463 | A2 | 6/2004 |
| WO | WO 2004/084746 | | 10/2004 |
| WO | WO 2005/046531 | | 5/2005 |
| WO | WO 2006/002492 | A1 | 1/2006 |

OTHER PUBLICATIONS

Gordon et al.; U.S. Appl. No. 12/952,057 entitled "Percutaneous Mitral Valve Annuloplasty Delivery System," filed Nov. 22, 2010.
Reuter et al.; U.S. Appl. No. 12/642,525 entitled "Adjustable Height Focal Tissue Deflector," filed Dec. 18, 2009.
Alferness et al.; U.S. Appl. No. 12/719,758 entitled "Device and Method for Modifying the Shape of a Body Organ," filed Mar. 8, 2010.
Pijls et al.; Measurement of fractional flow reserve to assess the functional severity of coronary-artery stenoses; The New England J. of Med.; vol. 334; No. 26; pp. 1703-1708; Jun. 27, 1996.
Yamanouchi, et al.; Activation Mapping from the coronary sinus may be limited by anatomic variations; vol. 21 pp. 2522-2526; Nov. 1998.
Mathis, Mark L.; U.S. Appl. No. 12/838,189 entitled "Mitral Valve Device Using Conditioned Shape Memory Alloy," filed Jul. 16, 2010.
Mathis et al., U.S. Appl. No. 11/782,490 entitled "Device and method for modifying the shape of a body organ," filed Jul. 24, 2007.
Mathis et al., U.S. Appl. No. 11/782,508, entitled "Device and method for modifying the shape of a body organ," filed Jul. 24, 2007.
Mathis et al., U.S. Appl. No. 11/782,527 entitled "Device and method for modifying the shape of a body organ," filed Jul. 24, 2007.
Gordon et al.; U.S. Appl. No. 11/971,174 entitled "Medical device delivery system," filed Jan. 8, 2008.
Nieminen et al; U.S. Appl. No. 12/060,781 entitled "Tissue shaping device," filed Apr. 1, 2008.
El-Maasarany et al.; The coronary sinus conduit function: Anatomical study (relationship to adjacent structures); http://europace.oxfordjournals.org/cge/content/full/7/5/475. (accessed Sep. 9, 2008).
Gray, H. Anatomy of the Human Body. The Systemic Veins. Philadelphia: Lea & Febiger, 1918; Bartleby.com. 2000. Available at www.bartleby.com/107/. Accessed Jun. 7, 2006.
Heartsite.com. Echocardiogram, 1999; p. 1-4. A.S.M. Systems Inc. Available at: http://www.heartsite.com/html/echocardiogram.html. Accessed Jul. 1, 2005.
Papageorgiou, P., et al. Coronary Sinus Pacing Prevents Induction of Atrial Fibrillation. Circulation. 1997; 96(6): 1893-1898.
Webb, et al. Percutaneous transvenous mitral annuloplasty initial human experience with device implantation in the coronary sinus. Circulation. 2006; 851-855.
Pai, Suresh; U.S. Appl. No. 60/329,694 entitled "Percutaneous cardiac support structures and deployment means," filed Oct. 16, 2001.

* cited by examiner

CATHETER CUTTING TOOL

INCORPORATION BY REFERENCE

All publications and patent applications mentioned in this specification are herein incorporated by reference to the same extent as if each individual publication or patent application was specifically and individually indicated to be incorporated by reference.

BACKGROUND OF THE INVENTION

Intravascular catheters are widely used to deliver a variety of medical devices to a target location within a patient. Many catheters include an intermediate braided layer that provides sufficient strength to provide torque transmission and to prevent the catheter from kinking while being advanced within the patient. A catheter can also be visualized using radiographic techniques such as fluoroscopy by incorporating radiopaque materials into the materials. It is common to incorporate a larger percentage of radiopaque materials in the distal tip than in other regions of the catheter. In addition, the distal end of a catheter is frequently required to be more flexible than the rest of the catheter to prevent damage to the vasculature as it is advanced through the patient.

One method of cutting, or trimming, a catheter distal tip to a desired length is to place a pin inside of the distal end of the catheter and to simply roll the catheter on a level surface while pressing a sharp edge (e.g., a razor blade) into contact with the catheter. The cutting element thereby trims the distal end of the catheter to the specified length. After cutting the catheter, the pin is removed, a measurement is taken of the distal tip of the catheter, and the process is repeated if necessary to bring the distal tip dimension length into tolerance. This method can result in non-square cuts (cuts that are not perpendicular to the longitudinal axis of the catheter), debris remaining on the distal end, and inaccurate distal tip lengths.

What is needed is a cutting tool that can create a square cut while accurately and reliably cutting distal tips of catheters to a specified length without necessarily using visual markers as a datum for measurement.

SUMMARY OF THE INVENTION

One aspect of the invention is a catheter cutting system. The system includes a catheter cutting body including a channel defining a catheter cutting body bore adapted to receive an elongate member and a catheter therein and a cutting member guide adapted to receive a cutting member therethrough. The catheter includes a stop feature and the elongate member is adapted to be received within a first portion of the catheter. The elongate member is adapted to interact with the stop feature to determine that the catheter is disposed at a desired location within the catheter cutting body bore.

In some embodiments the elongate member is adapted to interact with the stop feature to determine that the stop feature is disposed at a desired location within the catheter cutting body bore.

In some embodiments the stop feature comprises a first portion of the catheter with a first resistance to expansion and a second portion of the catheter with a second resistance to expansion different than the first resistance to expansion. The first portion of the catheter can have a first diameter and the elongate member can have a second diameter larger than the first diameter. The stop feature can include an annular band which provides the second portion of the catheter with the second resistance to expansion which is greater than the first resistance to expansion.

In some embodiments the cutting member further comprises a first catheter rotation element and wherein the system further comprises a second catheter rotation element adapted to be fixed in position relative to the catheter. The first and second catheter rotation elements are adapted to mate such that the catheter is rotated as the cutting member is advanced through the cutting member guide. The first rotation element can be a rack and the second rotation element can be a gear.

In some embodiments the system further comprises a catheter clamp comprising a lumen therein adapted to slidingly receive the catheter, wherein the catheter clamp is adapted to be at least partially disposed within the catheter cutting body bore. The system can also include a catheter locking element adapted to lock the catheter in place relative to the catheter clamp.

In some embodiments the system also includes an elongate member locking element adapted to lock the elongate member in place at a predetermined location relative to the cutting member guide.

In some embodiments the catheter comprises an intermediate braid layer and wherein the stop feature, such as a solder band, is disposed at the distal end of the intermediate braid layer.

One aspect of the invention is a method of cutting a catheter. The method includes providing a catheter cutting body, wherein the catheter cutting body comprises a cutting body bore and a cutting member guide. The method includes positioning a first portion of an elongate member and a first portion of a catheter within the catheter cutting body bore, and wherein the catheter comprises a stop feature. The method includes positioning the first portion of the elongate member within the first portion of the catheter, engaging the elongate member and the stop feature, and advancing a cutting member comprising a cutting element through the cutting member guide to thereby cut the catheter with the cutting element.

In some embodiments cutting the catheter with the cutting element comprises cutting the catheter with the cutting element at a location that is determined by the axial position of the stop feature.

In some embodiments the first portion of the elongate member comprises a first end, and wherein positioning the first portion of the elongate member within the catheter cutting body bore comprises securing the first end of the elongate member within the catheter cutting body bore at a predetermined distance measured from an edge of the cutting member guide.

In some embodiments the method also includes securing the catheter in place relative to the elongate member before cutting the catheter with the cutting element.

In some embodiments advancing the cutting member through the cutting member guide comprises rotating the catheter. Rotating the catheter can include engaging a first catheter rotation element with a second catheter rotation element.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings wherein:

DETAILED DESCRIPTION OF THE INVENTION

The invention relates generally to a cutting tool for cutting a catheter or other elongate medical delivery tool. More particularly, the invention relates to a cutting tool for accurately and reliably cutting a distal end or a proximal end of a catheter to a specified length without having to use visual markers as a datum for cut length measurement.

Figure 1:
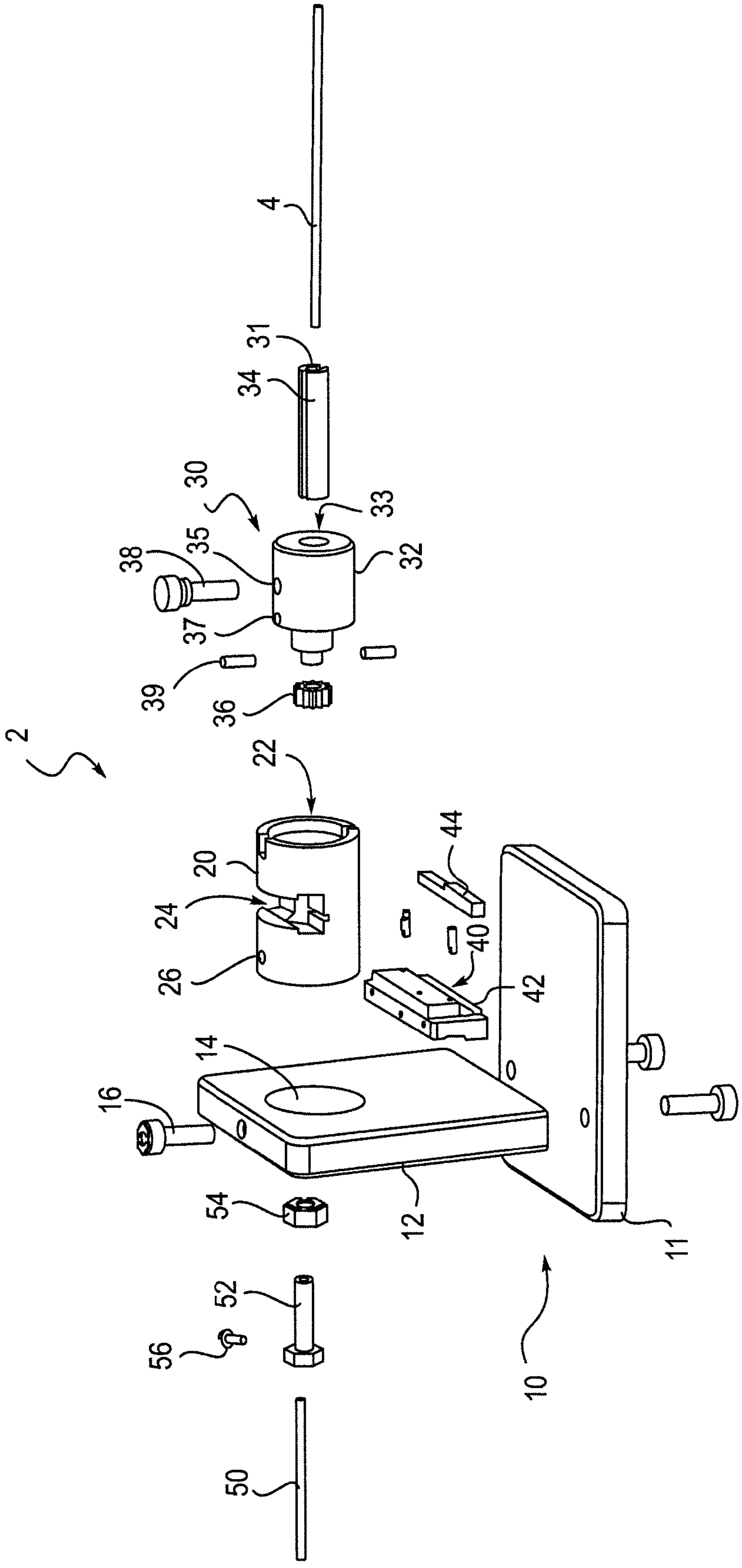
FIG. 1 is an exploded view of an exemplary cutting tool.

FIG. 1 is an exploded view of an exemplary embodiment of catheter cutting tool 2 (catheter 4 is also shown). Cutting tool 2 includes support 10 which includes baseplate 11 and vertical support 12. Cutting tool 2 also includes catheter cutting body 20. Cutting body 20 includes a channel defining a cutting body bore 22 therethrough to receive catheter clamp 30. Catheter clamp 30 includes catheter clamp body 32 and collet 34. Clamp body 30 has a channel which defines clamp body bore 33 therein to receive collet 34. Collet 34 has a channel which defines collet bore 31 therethrough for receiving catheter 4. Catheter clamp 30 also includes gear 36, screw bore 35 which receives screw 38, and locking pin bore 37 which receives locking pin 39.

In one specific embodiment the clamp body bore is about 0.375 inches in diameter and the collet bore is between about 0.125 and 0.128 inches in diameter.

Cutting body 20 also includes cutting member guide 24 adapted to receive and engage cutting member 40. Cutting member 40 includes a cutting element 42 and rack 44, which is adapted to engage with gear 36 of catheter clamp 30. Cutting member guide 24 is sized and shaped to align and stabilize cutting member 40 as it is advanced through cutting member guide 24. Cutting element 42 (e.g., a razor blade) engages and cuts catheter 4.

Vertical support 12 includes channel defining bore 14 to receive cutting body 20 while cutting body 20 has bore 26 for receiving screw 16, which stabilizes cutting body 20 in vertical support 12.

Figure 1A:
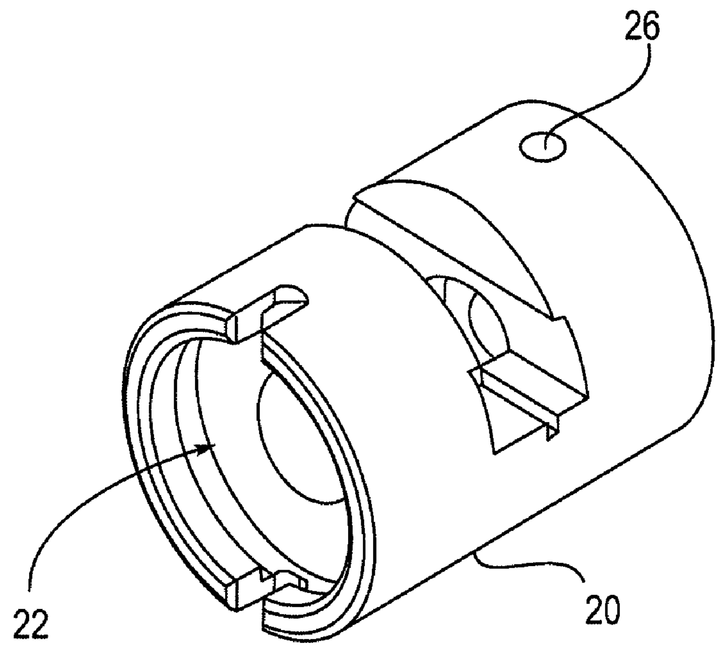
FIGS. 1A and 1B show an exemplary catheter cutting body.
Figure 1B:
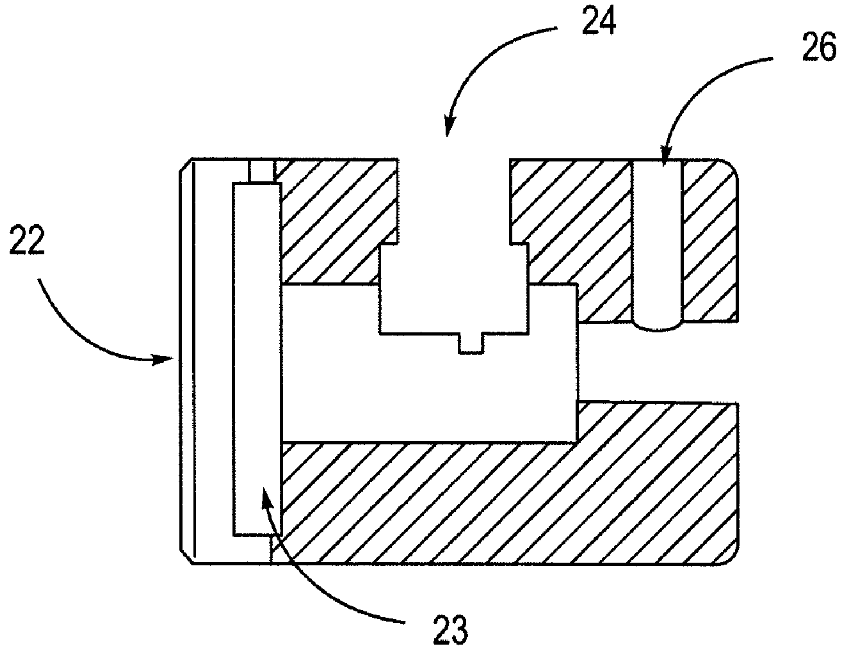

FIG. 1A is a perspective view of the cutting body shown in FIG. 1. FIG. 1B is a sectional view of cutting body 20. Cutting body bore 22 extends axially (i.e., longitudinally) through the cutting body (although it varies in diameter) and is sized to receive bolt 52 (from the opposite direction as catheter clamp 30; see FIG. 1), which has a lumen therethrough to slidingly receive elongate member 50. Nut 54 secures bolt 52 to cutting body 20. Elongate member 50 is stabilized within bolt 52 with elongate member locking pin 56.

Elongate member 50 is adapted to allow it be received within a distal tip of catheter 4 and is used in determining the location at which the catheter is cut by the cutting element, as is described in detail below. In one exemplary embodiment the elongate member has a diameter of about 0.101 inches and is about 2.00 inches in length. These are not intended to be limiting dimensions, and as described below the elongate member's dimensions can be varied based on the size of the catheter being cut and the location of the desired cut.

Figure 2:
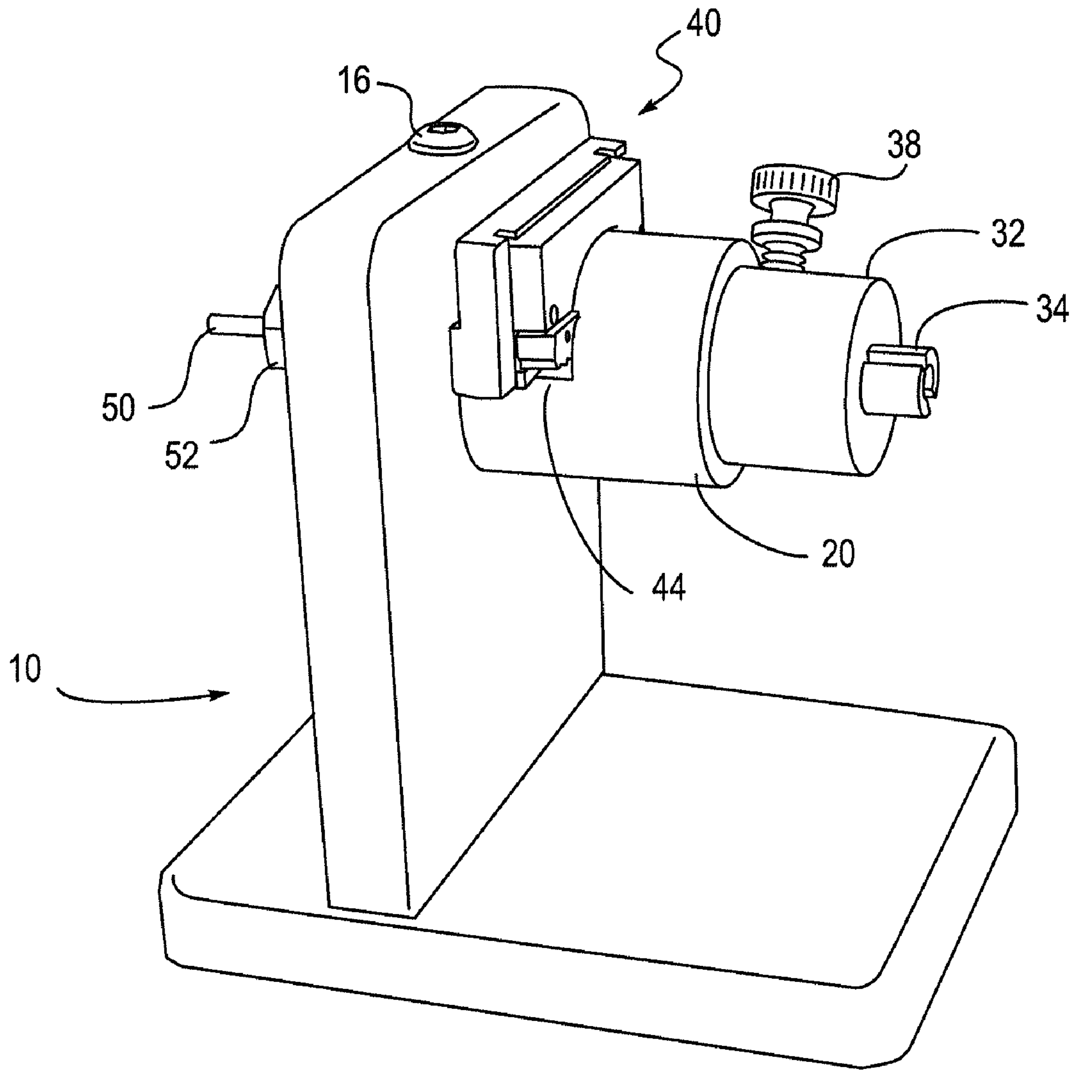
FIGS. 2 and 3 show the exemplary cutting tool of FIG. 1
Figure 3:
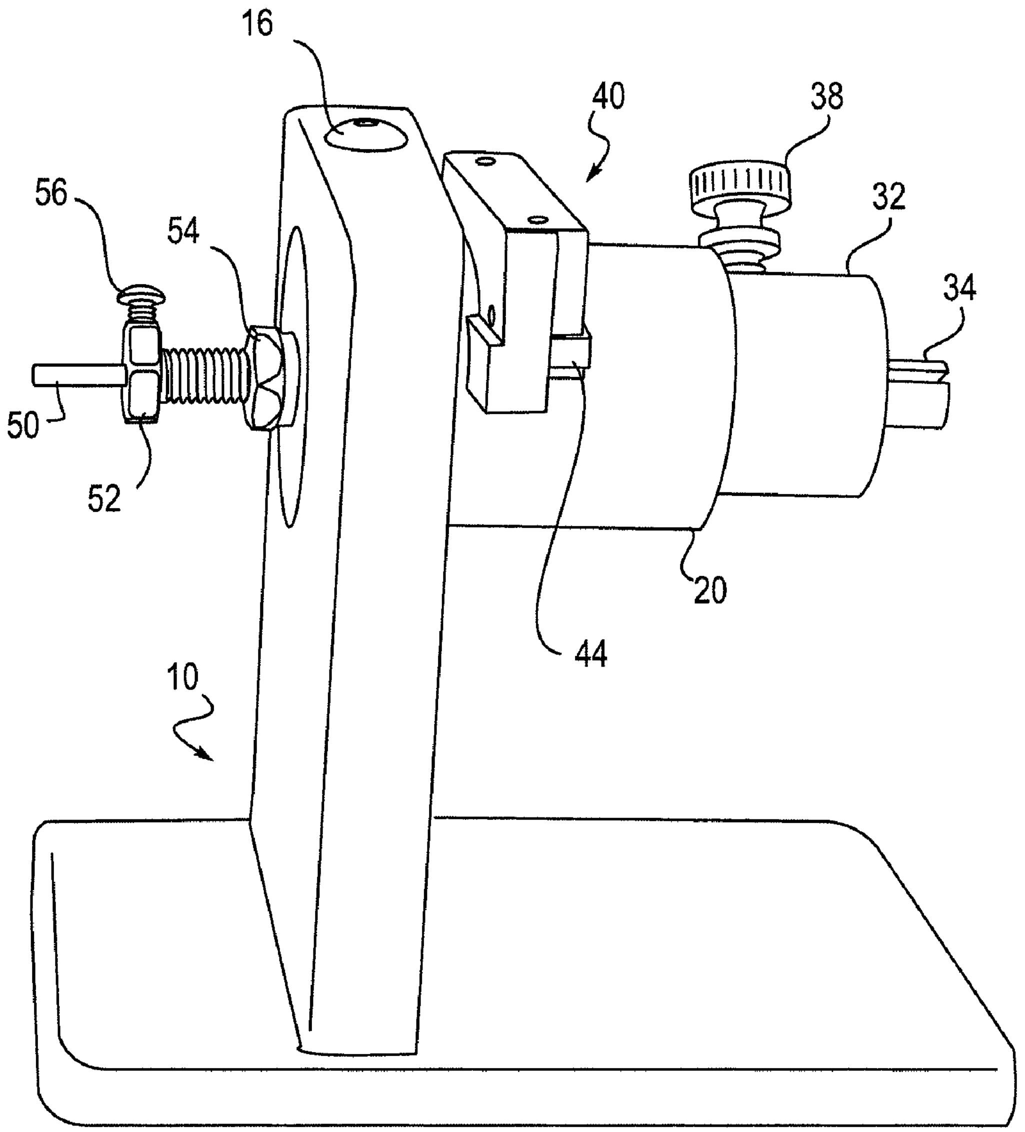

FIGS. 2 and 3 are perspective views of exemplary cutting tool 2 shown in FIG. 1. Cutting member 40 is shown engaging cutting member guide 24.

Figure 4A:
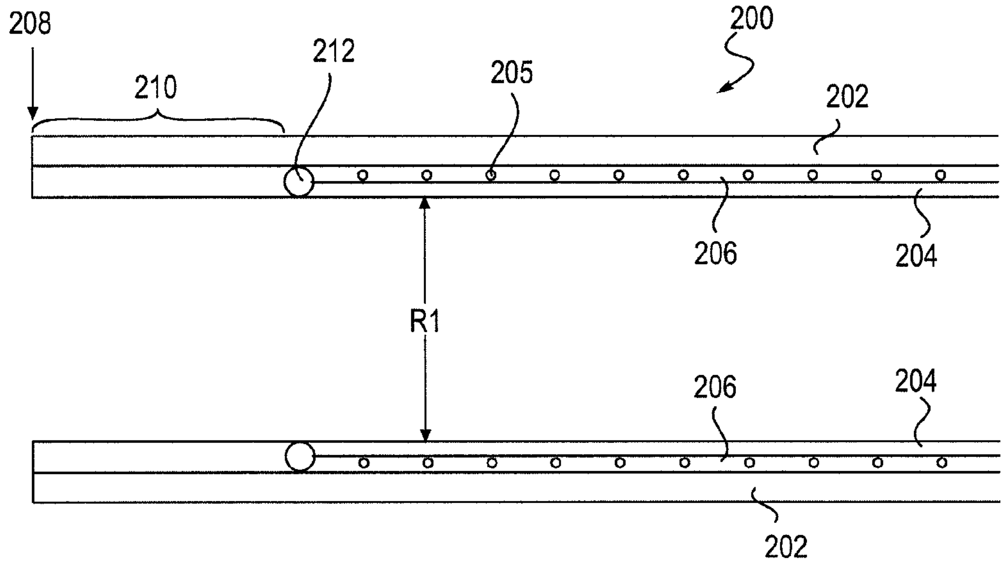
FIGS. 4A and 4B show a sectional view of the distal region of an exemplary catheter.
Figure 4B:
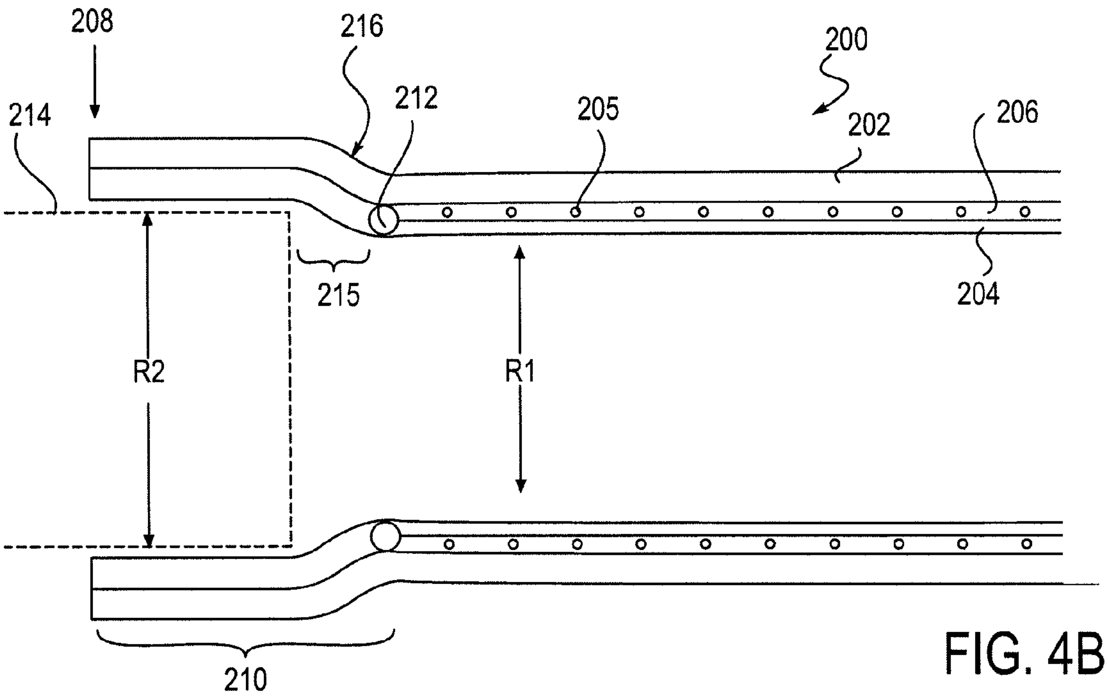

FIGS. 4A and 4B show a cross section of a distal portion of exemplary catheter 200 that can be cut using the cutting tool described herein. Catheter 200 comprises outer layer 202, inner layer 204, and intermediate layer 206 which is shown comprising a braided material 205. The layers shown are merely exemplary and the catheter can have more or fewer layers. In an exemplary embodiment, the outer layer comprises a thermoplastic elastomer such as PEBAX and the inner layer comprises a lubricous material such as PTFE.

The inner and outer layers of the catheter are shown extending to distal end 208 of the catheter. The braid layer does not extend to the distal end such that distal tip portion 210 of the catheter is free of the braided material. The distal tip is therefore more flexible than the catheter proximal to the distal tip.

It may be beneficial to prevent the distal end of the braided material from unraveling. In addition, or alternatively, it may be beneficial to adhere the distal end of the braid layer (or other portions proximal to the distal end) to one or more layers of the catheter (e.g., the inner and/or outer layer). FIGS. 4A and 4B show band 212 which can be used to either prevent the braid from unraveling or to adhere the distal end of the braid layer to either the outer and/or inner layers. In one embodiment the braid is a metallic wire such as stainless steel and the band is a solder band which solders the distal end of the metallic wires to prevent them from unraveling. The band can be any material or mechanism which can prevent the braid from unraveling. For example without limitation, the attachment band can be any metallic material, any glue-like material, any mechanical linkage, etc.

FIG. 4B illustrates stop feature 216 of catheter 200 and the interaction between a first end of elongate member 214 and the distal tip of catheter 200 to determine when the catheter is in a proper cutting position to be cut within the cutting body bore. In this embodiment distal tip 210 of catheter 200 is more flexible than the portion of the catheter which includes band 212. Distal tip 210 can therefore be radially expanded with less resistance than the portion of the catheter with band 212. This is illustrated in FIG. 4B. Elongate member 214 has a radius R2 which is slightly larger than the radius of catheter R1. As the distal end of catheter 200 is advanced over the end of elongate member 214, the size of elongate member 214 causes distal tip portion 210 to expand radially (slightly). Catheter 200 continues to be advanced over elongate member 214. Once it is disposed in the position shown in FIG. 4B, the band 212 will cause an increased resistance to the further advancement of catheter 200. This is because the band has a greater resistance to radial expansion than does the distal tip portion of the catheter. This difference in resistance can be detected (e.g., a user can tactilely detect the difference in resistance as the catheter is advanced because the catheter will appear to be snugly in place with respect to the elongate member) and once detected determines that the catheter has been advanced to the desired position within the catheter cutting body. This proper positioning allows the catheter to be cut such that the distal tip has the desired length.

In this embodiment stop feature 216 is the difference in resistance to radial expansion between a first portion of the catheter (i.e., the distal tip) and a second portion of the catheter (i.e., the section of the catheter in which band 212 is disposed). The difference in resistance is caused by band 212, which changes the flexibility of the two portions of the catheter.

In some embodiments a stop features as described herein can be referred to as a difference in a physical characteristic between a first portion of the catheter and a second portion of the catheter. For example, as described in the embodiment in FIGS. 4A and 4B, there is a difference in flexibility between the distal tip and the section of the catheter with the band. This creates an increased resistance to expansion, which can then be detected, in the section of the catheter with the band.

In some embodiments the stop feature can be referred to as a component or components of the catheter. For example, in the embodiment in FIGS. 4A and 4B, the stop feature includes the band and the section of distal tip directly adjacent to the band, shown as 215.

In general the stop features allows for the determination that the catheter has been positioned over the elongate member at a desired cutting location within the catheter cutting body bore.

Figure 5A:
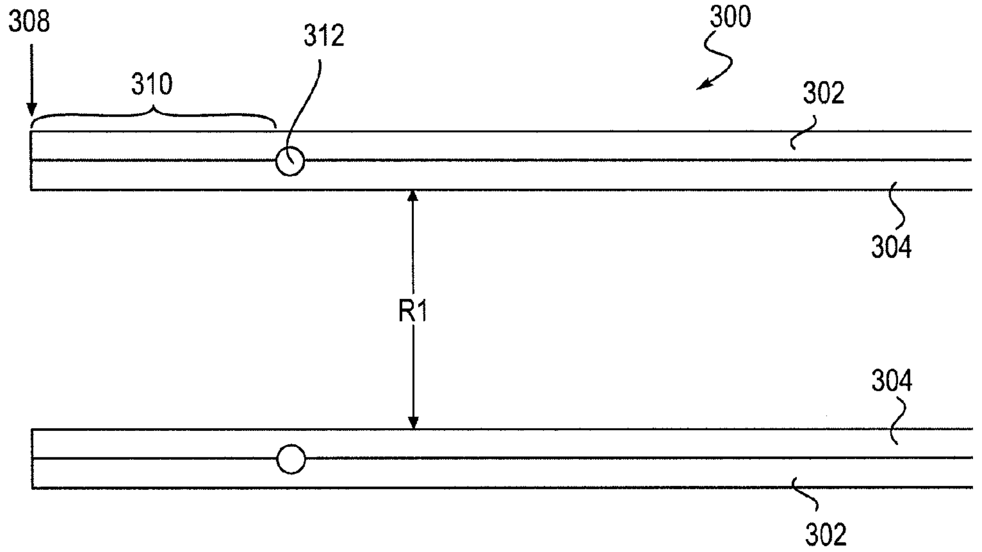
FIGS. 5A and 5B show a sectional view of the distal region of an exemplary catheter.
Figure 5B:
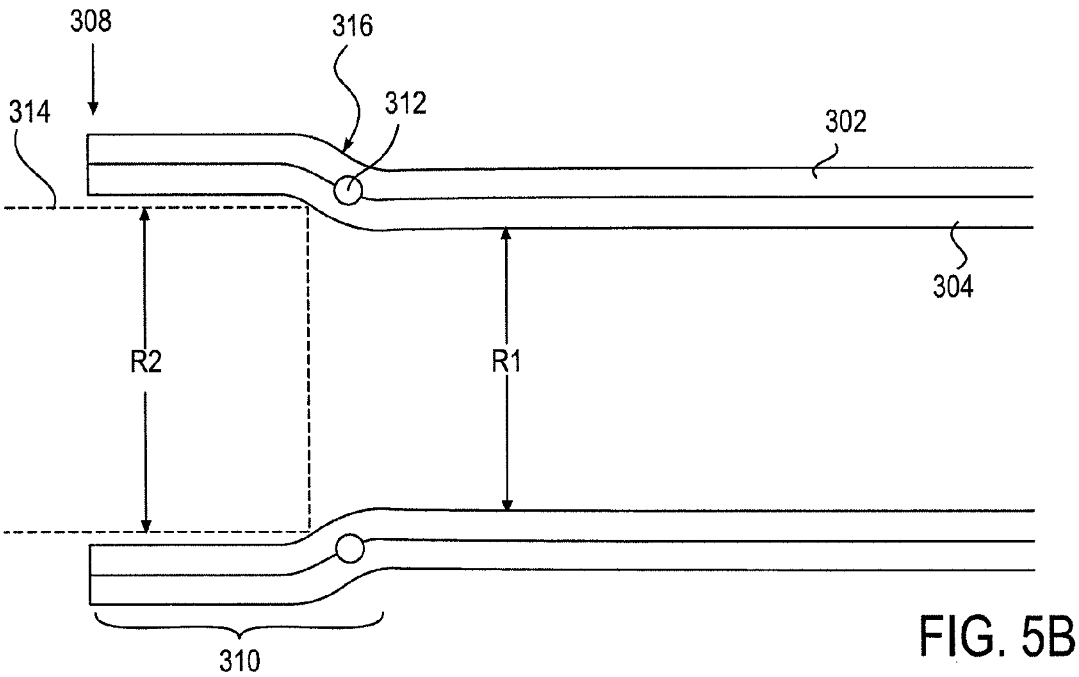

FIGS. 5A and 5B illustrate a cross section of a distal potion of exemplary catheter 300 similar to that shown in FIGS. 4A and 4B, however catheter 300 does not include a braided or intermediate layer. Catheter 300 includes outer layer 302, inner layer 304, and band 312. Band 312 is disposed between the inner and outer layers. The band can be adhered to the inner and/or outer layers using an adhesive, or the band can simply be held in place by the outer and inner layers. The band can be any type of material that will decrease the flexibility of the portion of the catheter in which the band is disposed. For example, the band can be metallic material, a polymeric material, etc. The band can also be an adhesive layer than adheres the two layers together. As shown in FIG. 5B, the portion of the catheter 300 that includes band 312 decreases the flexibility of that portion of the catheter compared to distal tip 310 and increases the resistance of that portion of the catheter to radial expansion, similar to the embodiment shown in FIGS. 4A and 4B.

Figure 6A:
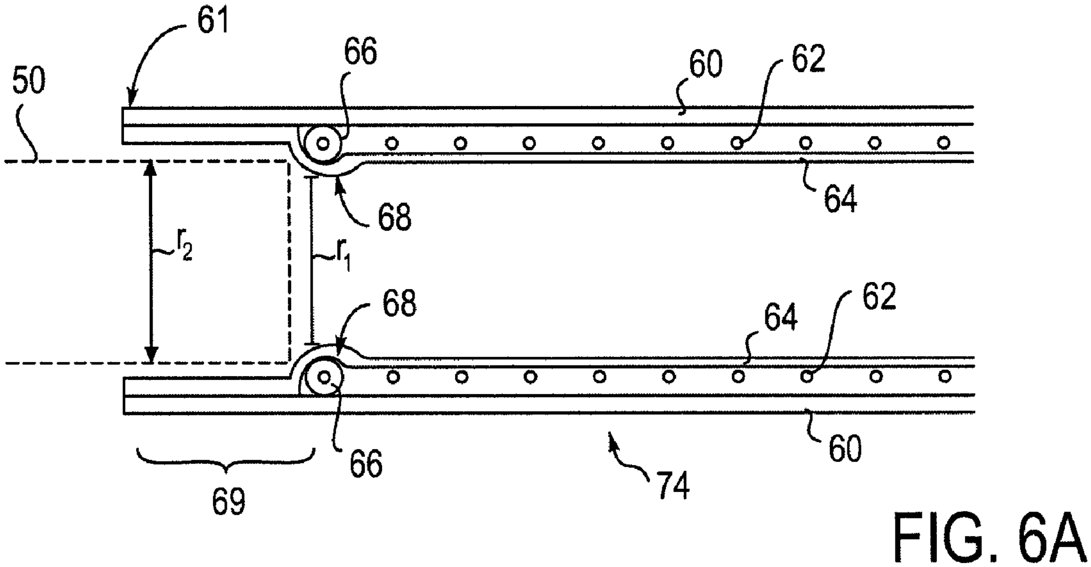
FIGS. 6A and 6B show a sectional view of the distal region of an exemplary catheter.

FIG. 6A shows a cross section of a distal potion of exemplary catheter 74 that can be cut using the cutting tool described herein. Catheter 74 comprises outer layer 60, inner layer 64, and intermediate layer 62 which is shown comprising a braided material.

The inner and outer layers of the catheter are shown extending to the distal end 61 of the catheter. The braid layer does not extend to the distal end such that distal tip 69 of the catheter is free of the braided material. The distal tip is therefore more flexible than the portion of the catheter proximal to the distal tip. Band 66 can be used to either prevent the braid from unraveling or to adhere the distal end of the braid layer to either the outer and/or inner layers. In one embodiment the braid is a metallic wire such as stainless steel and the band is a solder band which solders the distal end of the metallic wires to prevent them from unraveling. The band can be any material or mechanism which can prevent the braid from unraveling. For example without limitation, the attachment band can be any metallic material, any glue-like material, any mechanical linkage, etc.

Figure 6B:
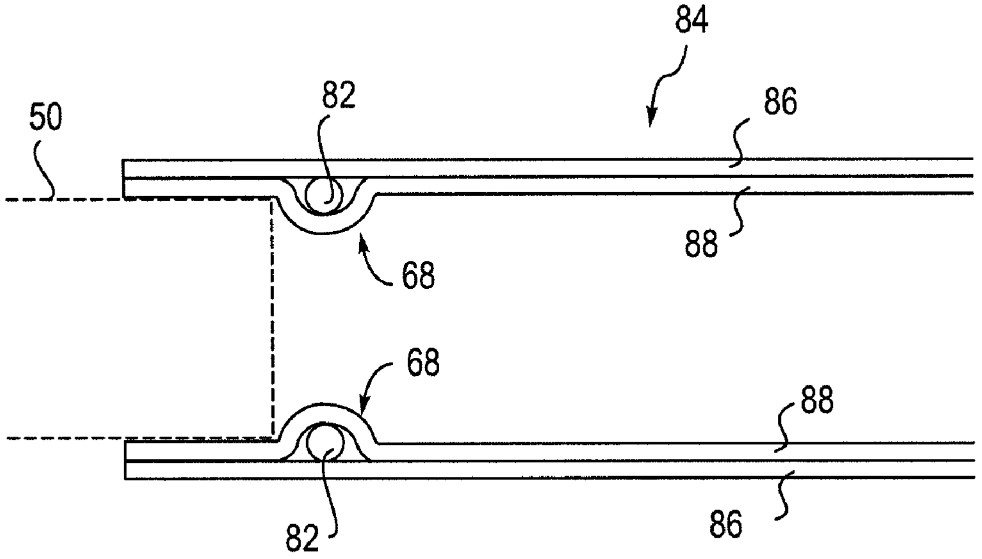

In the embodiment shown in FIG. 6A the band is disposed on the distal end of the braid layer such that when inner layer 64 is disposed adjacent the braid layer, the band causes inner layer 64 to bulge to form stop feature 68 (the bulge caused by the band is exaggerated in FIGS. 6A and 6B). The inner radius R1 of the catheter at the stop feature is less than the inner radius R2 in the distal tip. The difference in radius between R1 and R2 allows for elongate member 50 to be sized such that it can be advanced within the distal tip of the catheter to the location of the stop feature and not any further (or the catheter can be advanced over the elongate member; any relative movement may be used). Alternatively, the elongate member may be sized such that a user can tactilely detect when the end of the elongate member engages the stop feature.

FIG. 6B illustrates an alternative embodiment of catheter 84 that can be cut with the cutting tool described herein. Catheter 84 includes outer layer 86 and inner layer 88, and does not include a braid layer as does the embodiment shown in FIG. 6A. Catheter 84 includes attaching ring 82, which can be adhered to inner layer 88 and/or outer layer 86, or can simply be disposed between the two layers at a predetermined location. Attaching ring 82 causes the inner layer 88 to bulge at the location of the attaching ring to form stop feature 68. The stop feature allows for elongate member 50 to be advanced within the catheter in a similar manner to that described in reference to FIG. 6A. The attaching ring may simply be used only to create stop feature 68, and does not necessarily need to have any adhering properties and does not need to adhere any parts of the catheter to one another.

The materials for the catheter cutting body, the clamp body, collet, and support can be any suitable polymeric material. In one specific embodiment the catheter cutting body, the clamp body, and collet are made from Delrin (Polyoxymethylene). In one specific embodiment the support is made from HDPE (polyethylene).

Figure 7:
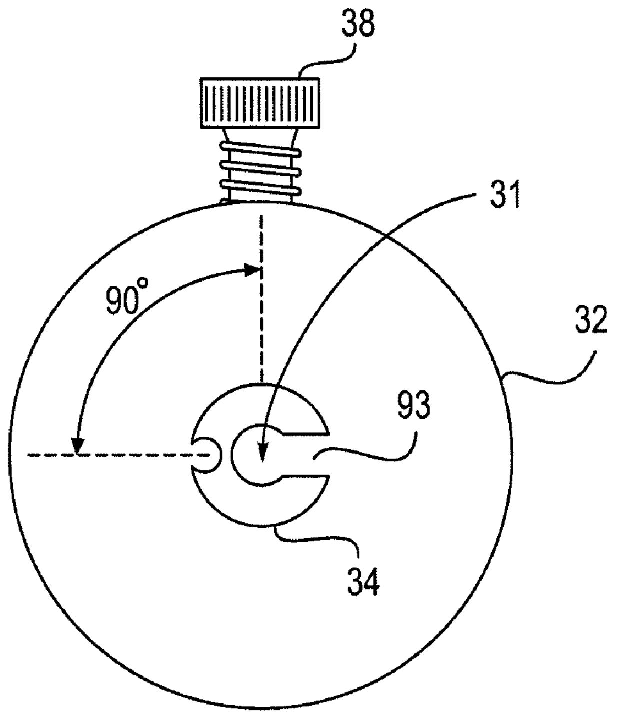
FIG. 7 shows an end view of a catheter clamp body and a collet disposed therein.
Figure 8:
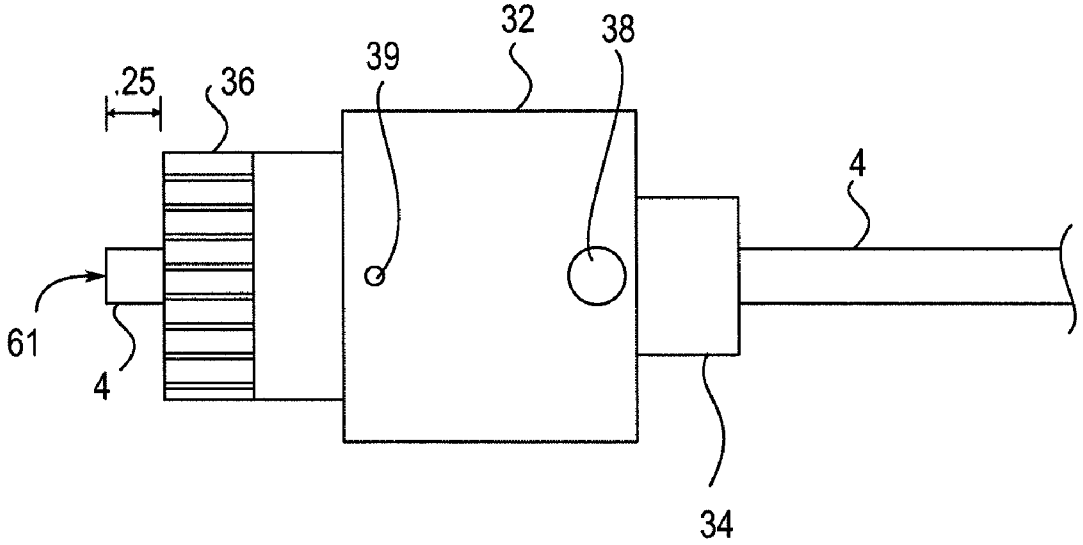
FIG. 8 shows a top view of a catheter clamp with a catheter disposed therein.

An exemplary method of cutting, or trimming, a catheter (or other elongate medical tool) using the exemplary cutting tool shown in FIGS. 1-3 will now be described. FIG. 7 shows an end view of the catheter clamp body 32 with collet 34 disposed therein. Split 93 in the collet is initially oriented about 90 degrees from the axis of screw 38, as shown in the figure. Catheter 4 is then frontloaded into the distal end of the collet 34 (the collet is partially disposed within catheter clamp body 32) such that the distal end of the catheter 61 is exposed beyond the distal end of the clamp body as shown in FIG. 8. In the exemplary embodiment shown, distal end 61 is advanced about 0.25 inches beyond gear 36.

Figure 9:
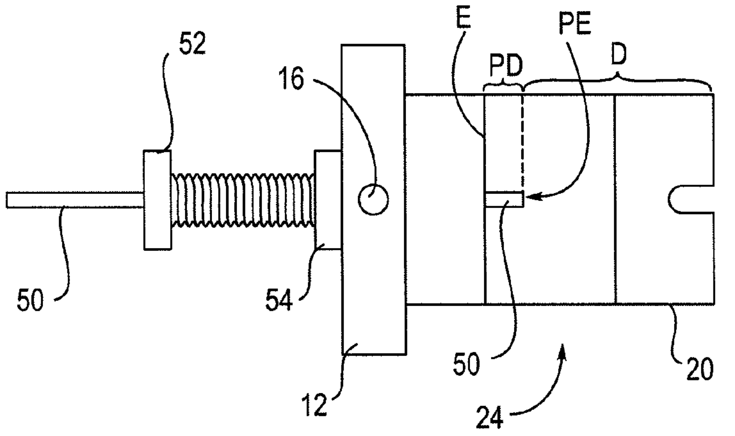
FIG. 9 shows a top view of a catheter cutting body with an elongate member disposed therein.

FIG. 9 is a top view and shows elongate member 50 advanced through bolt 52 and cutting body 20 until the proximal end PE of the elongate member is at a predetermined distance PD from edge E of the guide member 24. Distance PD can be determined by measuring distance D. Distance D can be measured by advancing a standard depth micrometer through bore 22 of the cutting body until it contacts proximal end PE of elongate member 50. The importance of the accuracy of distance PD is discussed below. In one exemplary embodiment the distance D is about 0.855 inches, which is used to create a distal tip length of about 0.065 inches.

Figure 10:
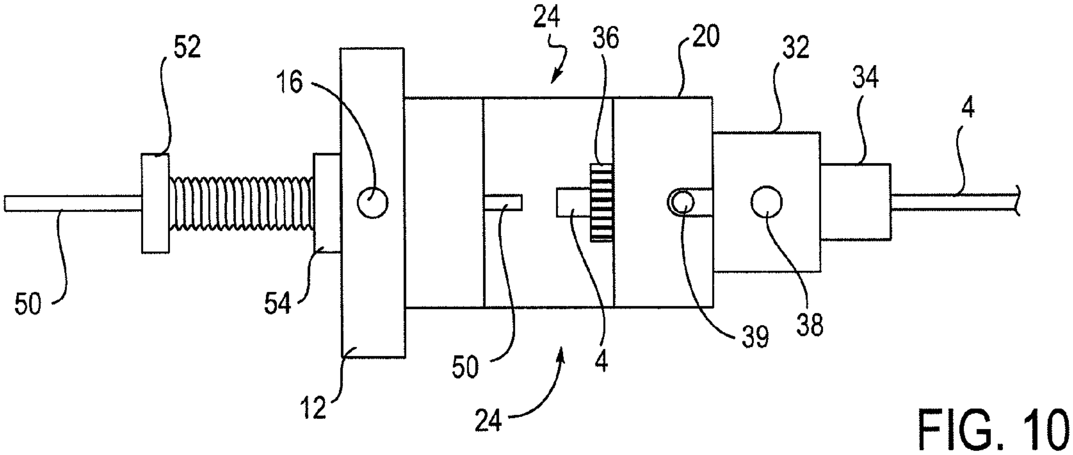
FIG. 10 shows a top view of a catheter cutting body engaged with a catheter clamp.

Next, catheter clamp body 32 (with catheter 4 disposed therein) is advanced into the proximal end of bore 22 in cutting body 20, as shown in the top view of FIG. 10. The catheter clamp body 32 is then rotated to engage locking pin 39 with a groove 23 (see FIG. 1B) on the interior of the cutting body 20.

Figure 11:
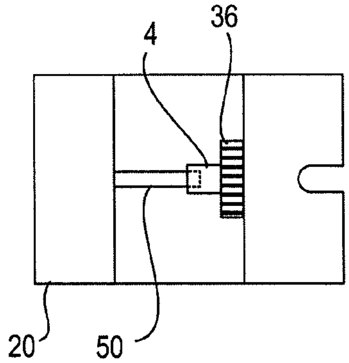
FIG. 11 shows a top view of a tip of a catheter positioned over an elongate member within a catheter cutting body.

Catheter 4 is then advanced through the collet towards elongate member 50 until the distal end of the catheter is advanced over elongate member 50, as is shown in FIG. 11 (other elements of the cutting tool are not shown for clarity). The proximal end of elongate member 50 within the distal end of catheter is shown in phantom. The catheter is advanced until the elongate member interacts with stop feature 68 as is described above in relation to the embodiments shown in FIGS. 4A-6B. Screw 38 (not shown in FIG. 11) is then tightened to compress the collet and secure the catheter in place relative to the elongate member within the cutting body bore. Additionally, this secures the catheter in place within the cutting member guide such that a cutting member can be advanced through the cutting member guide to cut the catheter.

Figure 12:
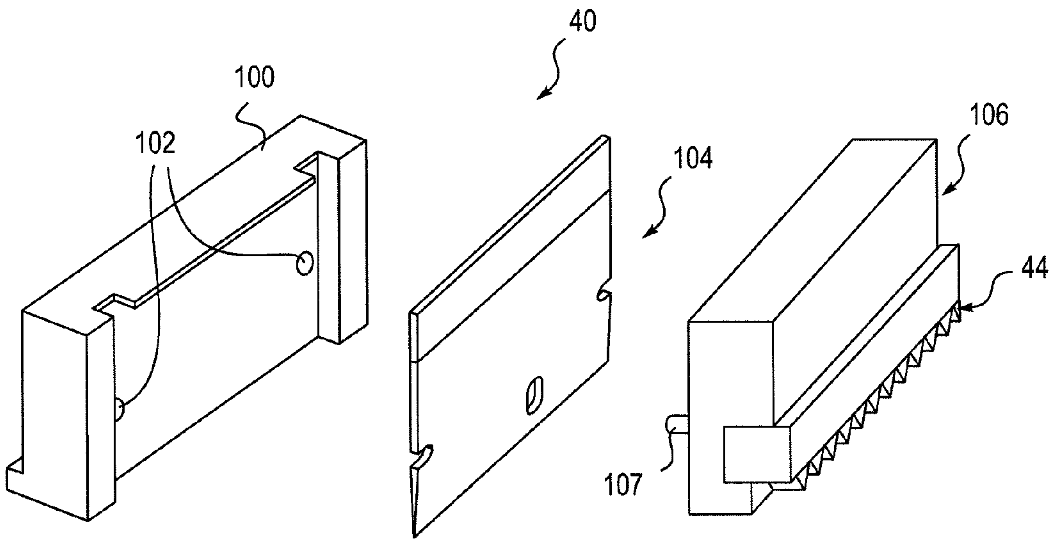
FIG. 12 is an exploded view of an exemplary cutting member.

Once the catheter is at the desired location and is secured in place, the catheter is then cut. FIG. 12 shows an exploded view of an exemplary cutting member 40 that can be used with the cutting device to cut the catheter. Cutting member 40 includes cutting element holder 100 which includes pin holes 102. Cutting element 104 is secured between the holder 100 and cutting element clamp 106. Cutting element clamp 106 includes cutting element holder pins 107 which are sized to fit in pin holes 102 and to secure cutting element 104. Cutting element clamp 106 includes rack 44 which mates with gear 36 of the catheter clamp (see FIG. 1) to rotate the catheter as the cutting member is advanced through cutting member guide 24.

Cutting element holder and cutting element clamp can be made from, for example, a metallic material. In one specific embodiment they are made from aluminum (In this embodiment, rack 44 is not made of aluminum). The cutting element need only be able to cut through the layers of the catheter and can be, for example, a razor blade.

Figure 13:
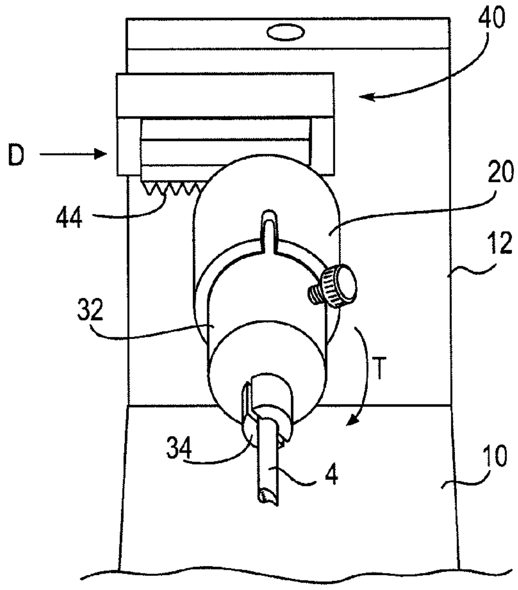
FIG. 13 is a perspective view of a cutting member engaged with a cutting member guide.

FIG. 13 is a perspective end view of cutting device 2 wherein the cutting member 40 is positioned in the cutting member guide to cut the catheter. Cutting member guide 24 in the cutting body (see FIG. 1) engages cutting member 40 to align cutting member 40 as it is advanced through guide 24 and provide for a straight cut. A generally downward force is applied to cutting member 40 as it is advanced in the direction of arrow D until rack 44 engages the gear (not shown) on the catheter clamp body 30. Cutting element 40 continues to be advanced through the cutting member guide such that rack 44 engages and turns the gear, which causes the catheter to rotate in the direction of arrow T. The cutting element also engages and cuts the catheter. The cutting member is advanced until the catheter completes at least one full revolution while in contact with the cutting element. The cutting element thereby makes a full revolution cut in the distal tip of the catheter.

Figure 15:
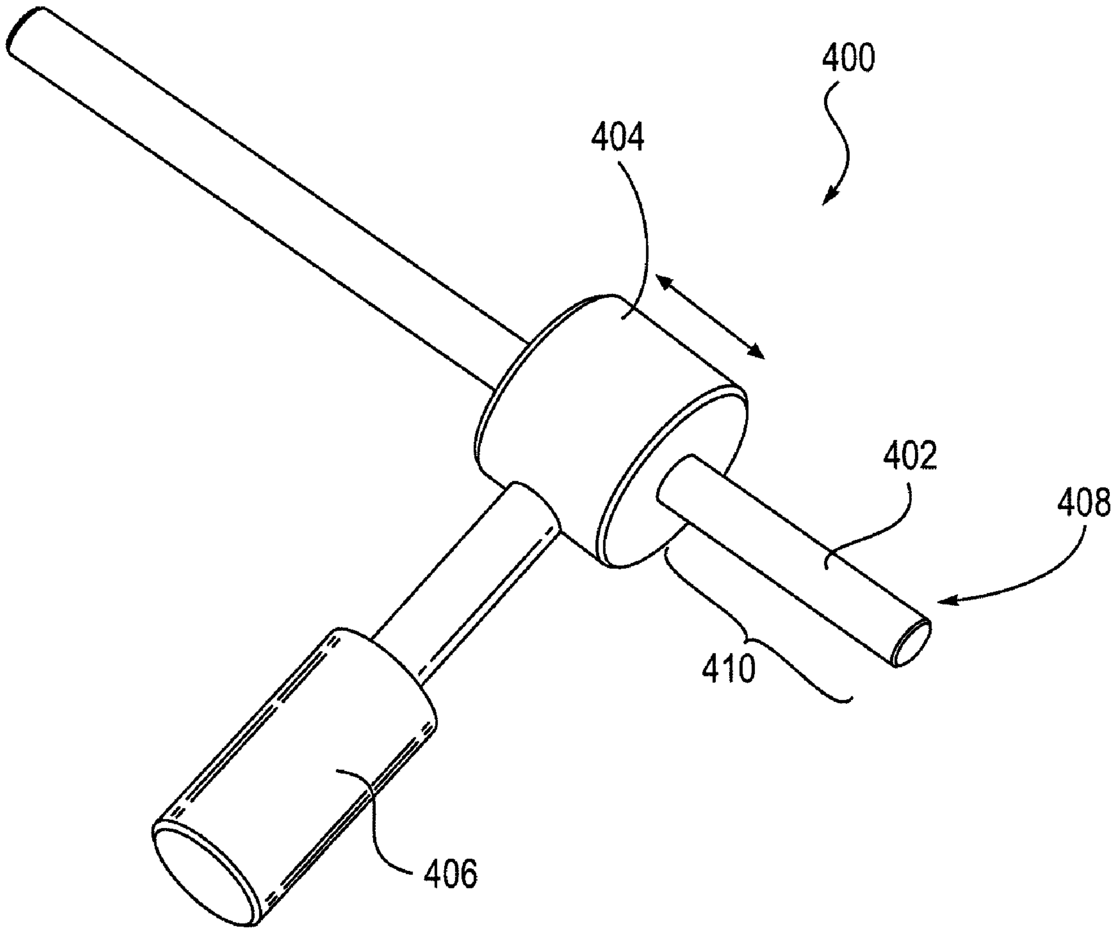
FIG. 15 illustrates an exemplary tool used to confirm the length of a tip section of a catheter.

The cutting member is removed from the cutting body and the catheter clamp is removed from the cutting body. The catheter is then removed from the collet and the distal tip is accurately measured to ensure the distal tip length is within tolerance. FIG. 15 shows an exemplary tool to use to confirm the distal tip is within tolerance. The tool includes collar 404 with a lumen therethrough adapted to receive elongate measuring member 402. Collar 404 is adapted to slide with respect to elongate measuring member 402 in the direction of the arrows. Collar 404 has a bore therein to receive thumbscrew 406, which is adapted to engage elongate measuring member 402 within the collar and lock it in place relative to collar 404.

In use, first end 408 of elongate measuring member 402 is inserted into the cut distal tip of the catheter until elongate measuring member 402 interacts with the stop feature in the same manner as the elongate member described above. Elongate measuring member 402 and the elongate member have the same diameter. In this embodiment elongate measuring member 402 is advanced within the distal tip until it is snug and is met with increased resistance to continued advancement. Collar 404 is then slid along elongate measuring member 402 towards the distal tip of the catheter (not shown) until it contacts the distal tip of the catheter. Thumbscrew 406 is then tightened to secure collar 404 in place with respect to elongate measuring member 402. After this step the portion of elongate measuring member 402 within the distal tip of the catheter is shown in FIG. 15 as portion 410 (catheter not shown). Elongate measuring member 402, with collar 404 locked in place, is then removed from the cut distal tip of the catheter. The length of portion 410 is thus the same (or should be substantially the same) as the length of the distal tip of the catheter. The length of portion 410 is then accurately measured to make sure it is within tolerances.

It is important that elongate measuring member 402 has a diameter that is the same as the elongate member described above. This ensures that both elongate measuring member 402 and the elongate member will interact with the stop feature within the catheter in the same manner so that the length of portion 410 accurately reflects the length of the cut distal tip as closely as possible.

One advantage of the cutting tool is that it can accurately cut a catheter such that a distal tip has a specified length (within tolerance). The tool can also, or alternatively, be used to cut the proximal end of the catheter. As described herein, the cutting member includes a cutting element (e.g., razor blade). When the cutting member is positioned in cutting member guide 24, the cutting element (which is clamped between cutting element holder 100 and cutting element clamp 106; see FIG. 12) is disposed at a specific distance from edge E of cutting member guide 24 (see FIG. 9). In order to cut the distal end of the catheter such that the distal end has a specified length, the cutting element must be positioned such that it engages the catheter at a specified location (i.e., the location at which the catheter is to be cut). To control the axial position of the catheter (i.e., the position along the longitudinal axis of the catheter) so that the cutting element cuts it at the specified location, the elongate member is advanced through bolt 52 (see FIG. 9) until elongate member proximal end PE is at length PD from edge E of the cutting body 20. As described above, the exemplary catheters include a stop feature which interacts with the elongate member to determine when the catheter is at the desired location. The length PD (or distance D, as the distance is relative) will determine the position of the distal end of the catheter after the catheter is advanced over the elongate member and the elongate member interacts with the stop feature. Therefore, to vary the location at which the catheter will be cut (and thereby vary the length of the distal tip), length PD can be varied by axially advancing or retracting elongate member 50 through bolt 52.

Figure 14:
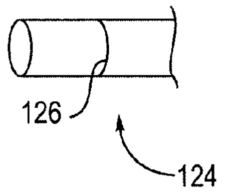
FIG. 14 shows a catheter with a visual marker.

In some embodiments the position of the catheter within the cutting body bore can be determined in a non-mechanical manner. For example, the stop element can comprise a visual marker which can allow a user to determine that the catheter has been advanced to a desired location over the elongate member. FIG. 14 shows an exemplary embodiment of catheter 124 with visual marker 126. As the catheter is advanced through collet, as shown in FIG. 10, the catheter is advanced until the user can visualize marker 126 adjacent the distal end of gear 36. Using a visual marker may not be as accurate as interacting an elongate member and a stop feature, but it may be sufficient in cases where the reliability and accuracy attained using a visual marker is sufficient.

An additional advantage of the cutting tool described herein is the ability to make clean, square cuts. By stabilizing the catheter inside the collet and by aligning the cutting member with the cutting member guide, the cutting element can be disposed in contact with the catheter and advanced along a substantially straight line such that a substantially straight cut can be made in the catheter.

An additional advantage of the inventive cutting tool is that by incorporating a first and second rotation engagement elements (e.g., the rack and gear engagement), the catheter is rotated as the cutting element is advanced through the cutting member guide. Specifically, the catheter rotates in synchronization with the advancement of the cutting element. This creates a full revolution cut in the catheter and ensures that the entire cut made in the catheter is made with an unused and sharp portion of the cutting element (i.e., a portion of the cutting element that has not already cut another portion of the catheter). This ensures a dull portion of the cutting element is not used to cut any portion of the catheter, which could result in an incomplete cut. While the rack and gear system provides advantages for the cutting tool, it is envisioned that the cutting tool can be used without the rack and gear system. For example, in an alternative embodiment, a user could theoretically rotate the catheter clamp body (and thereby rotate the catheter) while the cutting member is advanced through the cutting member guide, although this could result in an incomplete cut.

While the cutting tool has been described herein as making a cut along the entire circumference of the catheter, it is envisioned that the cutting tool could be used to make cuts that do not make a full revolution. For example, a cut could be made in the catheter that extends ¾ of the way around the catheter. Alternatively, the cutting member guide could be at an angle other than 90 degrees to the longitudinal axis of the cutting body to allow for off-angle cuts to be made in the catheter. For example, while the cuts described herein are square cuts, the cutting tool can be adapted (by altering the angle of the cutting member guide) such that the cut is at an angle of 45 degrees, generating a bevel cut.

The cutting tool described herein has been described as being manually operated (the cutting member is manually advanced through the cutting member guide). The cutting tool can theoretically be automated such that the cutting member is automatically positioned and advanced through the cutting body to cut the catheter.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of cutting a catheter, comprising:

providing a catheter cutting body, wherein the catheter cutting body comprises a cutting body bore and a cutting member guide;

positioning a first portion of an elongate member and a first portion of a catheter within the catheter cutting body bore, wherein the catheter comprises a stop feature comprising a difference in a physical characteristic between the first portion of the catheter and a second portion of the catheter;

positioning the first portion of the elongate member within the first portion of the catheter;

engaging the elongate member with the stop feature to detect positioning of the catheter at a desired cutting location;

advancing a cutting member comprising a cutting element through the cutting member guide thereby cutting the catheter with the cutting element.

2. The method of claim 1 wherein cutting the catheter with the cutting element comprises cutting the catheter with the cutting element at a location that is determined by the axial position of the stop feature.

3. The method of claim 1 wherein the first portion of the elongate member comprises a first end, and wherein positioning the first portion of the elongate member within the catheter cutting body bore comprises securing the first end of the elongate member within the catheter cutting body bore at a predetermined distance measured from an edge of the cutting member guide.

4. The method of claim 1 further comprising securing the catheter in place relative to the elongate member before cutting the catheter with the cutting element.

5. The method of claim 1 wherein advancing the cutting member through the cutting member guide comprises rotating the catheter.

6. The method of claim 5 wherein rotating the catheter comprises engaging a first catheter rotation element with a second catheter rotation element.

* * * * *